May 12, 1942.　　　C. E. VOLK　　　2,282,625
CHEMICAL SPREADER
Filed March 23, 1940　　　3 Sheets-Sheet 1

INVENTOR.
CHARLES E. VOLK
BY U. G. Charles
ATTORNEY.

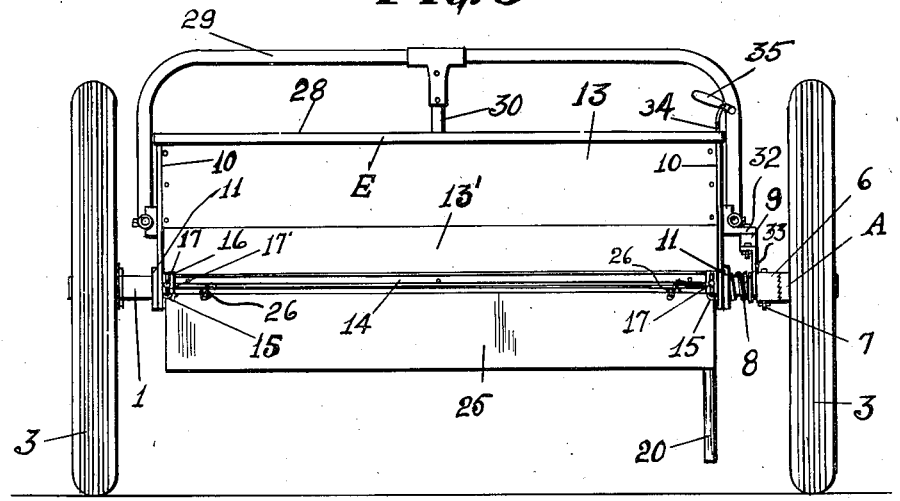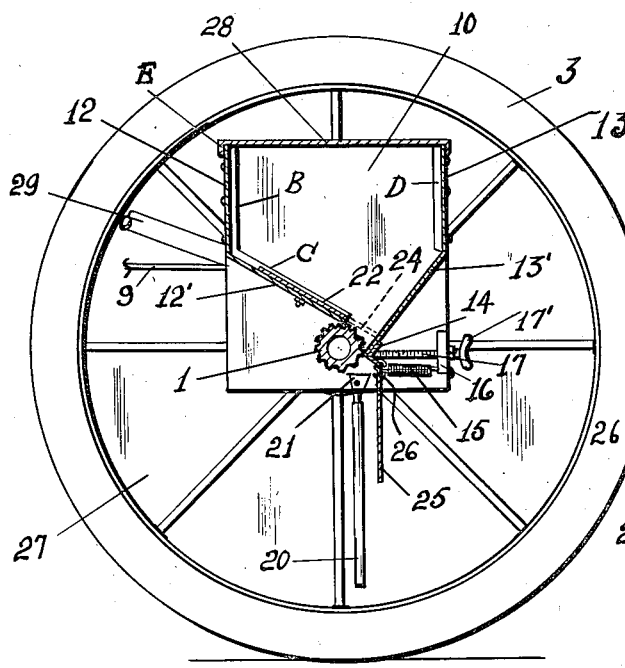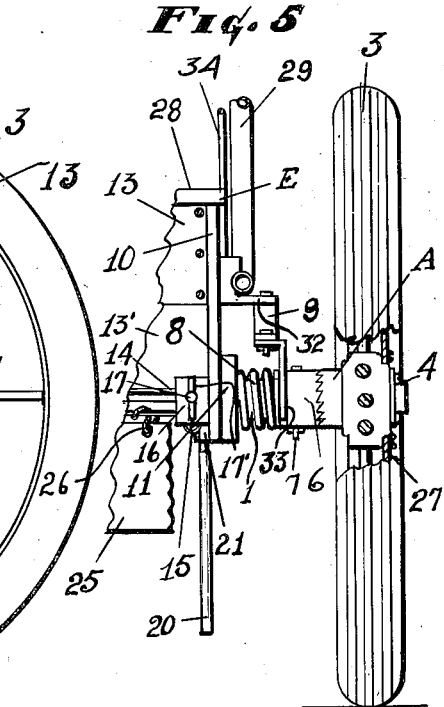

May 12, 1942.  C. E. VOLK  2,282,625
CHEMICAL SPREADER
Filed March 23, 1940  3 Sheets-Sheet 3
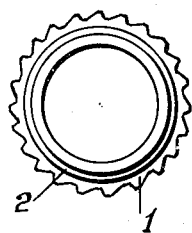
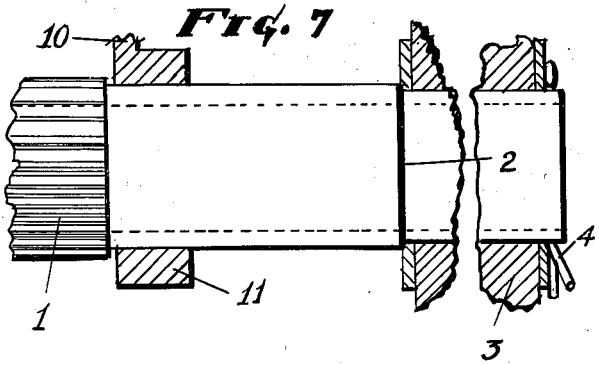
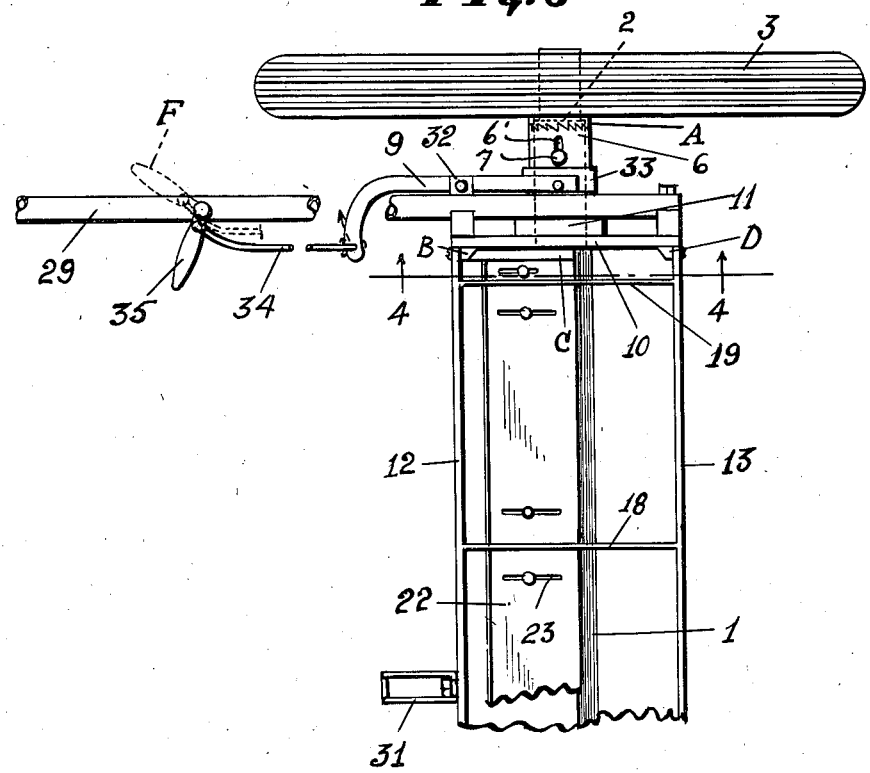
INVENTOR.
CHARLES E. VOLK
BY
ATTORNEY.

Patented May 12, 1942

2,282,625

UNITED STATES PATENT OFFICE 2,282,625

CHEMICAL SPREADER

Charles E. Volk, El Dorado, Kans.

Application March 23, 1940, Serial No. 325,616

3 Claims. (Cl. 221—130)

The invention herein disclosed is a continuation-in-part of my former application Patent Number 2,243,233 and relates to a chemical spreader to eradicate bindweed or other obnoxious plants, and has for its objects, first, a means in the hopper whereby tilting of the machine from a horizontal plane will obviate displacement of the chemical from one end of the machine to the other.

Second, the provision of a marker to determine the path along which the machine was conveyed, to avoid an overlap of the chemical discharge in consecutive rounds while treating a field of bindweed.

Third, to provide an effective clutch mechanism and controlling means to operate the same.

Fourth, to provide an adjustable side for the hopper to move toward and from the chemical dispenser to vary the quantity of chemical dispensed, and means to permanently close the discharge independent of the adjustment control.

Fifth, to provide an efficient baffle means against wind velocity to avoid excess drifting of the chemical on its path downward from the machine, said baffle means being in parallelism with the shaft dispenser for the chemical and also a baffle at each end of the machine carried by the wheels.

Sixth, to reconstruct the toothed dispenser from that shown in my former application.

Seventh, to provide a simple and efficient lid for the hopper that is weather proof, to avoid contamination of moisture with the chemical.

These and other objects will hereinafter be more fully explained, reference being had to the accompanying drawings forming a part thereof, in which like characters will apply to like parts in the different views.

Referring to the drawings:

Fig. 3 is a front view of the machine.

Fig. 4 is an enlarged sectional view taken on line 4—4 in Fig. 8 looking in the direction of the arrows.

Fig. 5 is a transverse view of Fig. 4, parts removed for convenience of illustration.

Fig. 6 is an enlarged end view of the axle.

Fig. 7 is an enlarged plan view of the axle spindle, partly removed, also the hub of its wheel and hopper bearing, the two latter being in section.

Fig. 8 is a fragmentary plan view of the machine, the lid removed from the hopper and other parts broken away for convenience of illustration.

Figure 1:
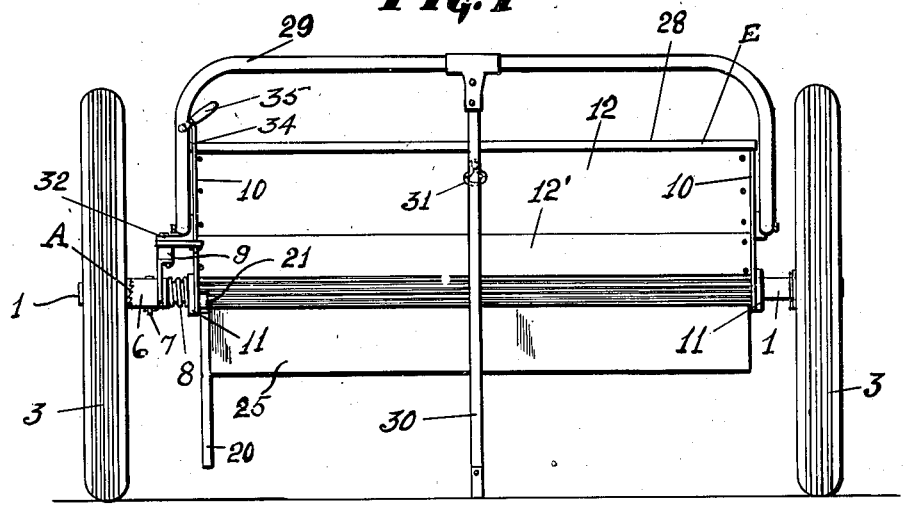
Fig. 1 is a rear view of the machine.
Figure 2:
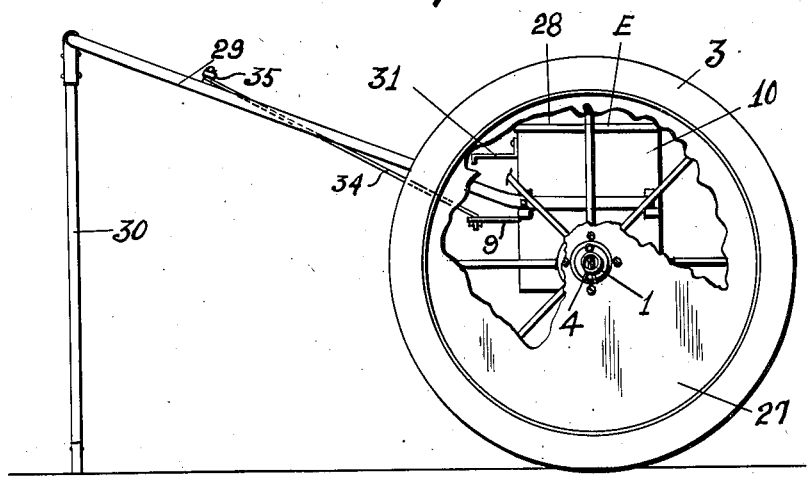
Fig. 2 is an end view of Fig. 1 showing the support of the handle bar during an idle period of the machine, parts removed from the wheel baffle for convenience of illustration.

The machine consists of a tubular axle 1 having a spindle on each end thereof, each spindle being formed by reducing the diameter of the axle to provide a shoulder 2 against which a hub of a wheel 3 will abut, and each wheel being secured on the spindle by a linchpin 4 passing through the spindle and outwardly extending from each side thereof and against which the outer end of the hub will engage whereby the wheels are retained but free to rotate on the spindles.

The inner end of the hub of one wheel as at A has a series of ratchet teeth extending therearound to engage with an abutting end of a sleeve 6, said end having similar teeth to that of the hub and to be ratchetedly engaged by the teeth of the hub, the said sleeve rotatably carried on the spindle and adapted to slide longitudinally thereon for engagement of its teeth with the teeth of the hub. It will be seen that the sleeve is controlled by a pin 7 diametrically passing through the spindle and sleeve, there being a pair of elongated slots 6' diametrically aligned through the wall of the sleeve to engage their respective ends of the pin whereby the sleeve is rotatable with the shaft and slidable longitudinally thereon, the said sleeve being held in engagement with the hub of the wheel by a spring 8 wound on the spindle, said spring engaging between the sleeve and hopper bearing (the latter later described). There is also provided a lever 9 (later described) to actuate the clutch, by which lever the clutch is thrown out of gear to avoid dispensing of the chemical when moving the machine from one place to another.

The shaft of the axle has a series of ridges extending longitudinally of the axle and spaced therearound, said ridges being saw-toothed with respect to cross section, the rotation of the axle when the clutch is engaged will be clockwise as the machine moves forward and free to ratchet when moved rearward to avoid turning of the axle. The advancing sides of the ridges or teeth have a lesser tangent angle with respect to the turning axis of the axle than that of the other side whereby chemical dispensed thereby is ground and forced through the feed opening.

Seated on the axle and upwardly extending therefrom is a chemical hopper comprising end plates 10 rectangular in form and being bored a spaced distance upward from the lower end thereof and aligned with the vertical axis of the plate. The bore of each plate has a hub 11 outwardly extending to function as a bearing for the axle, and the said plates are connected by walls 12 and 13, through the medium of shoulders B, C, and D, respectively, to which said walls are secured, said walls 12 and 13 being oppositely positioned and adjacent their respective edge of the plate, the walls being in parallelism vertically and extending downward to near the center of the plate and from thence slanting towards each other where they meet the toothed axle, the slanting portion 12' contacting the points of the teeth at the vertical plane passing through the axis of the shaft while the slanting portion 13' is approximately tangent with the peripheral arc of the teeth points and rockable toward and from said teeth to function as a control for the feed opening for crystalline chemical contained in the hopper, it being understood that the said wall portion 13' is flexible for its rocking movement and having on its lower edge thereof an angle iron 14 extending therealong and secured thereto as stiffening means for the lower edge of the flexing portion, and the said edge portion being tensioned outward by a coil spring 15, one end of which is secured to one leg of the angle bar while the other end is secured to an ear 16 integral with said end wall. Adjacent the spring and thereabove is a threaded bolt 17 threadedly engaging in said ear, the inner end of the bolt seating at the leg intersection of the L-shaped member whereby the said exit opening may be completely closed or partially so by screwing the bolt theretoward, said bolt being turned by a wing structure 17' on the other end thereof. It will be understood that a spring and bolt as described is positioned at each end plate to maintain the feed opening equally spaced throughout its length.

Positioned in the hopper transversely crossing the same is a plurality of partitions 18 to obviate displacement of the chemical from one end of the hopper to the other whereby the chemical is retained in equal quantity on the toothed axle dispenser. There is also provided a similar partition 19 spaced a short distance from the end plate of the hopper whereby a container is formed for a powdered substance such as slack lime, or the like, to function as a marker for the machine's line of travel, the substance being dispensed by the toothed axle extending thereunder and being discharged through a spout 20 communicating with the bottom of the container, the spout being secured to the hopper by a nipple 21 over which the end of the spout will engage. The downward extension of said spout is to deposit a white line on its path of travel during operation of the machine, and being at one side of the chemical as spread.

Adjustably secured to the slanting portion 12' is a plate 22 between the partitions and their respective end wall, said plates having elongated slots 23 through which bolts will extend and being secured stationarily to portion 12' functioning as anchors for the plates selectively when moved downward to close their respective portion of the hopper as shown by dotted lines 24, the hopper being subdivided is a further means to dispense chemical selectively as divided.

Pendantly carried beneath the hopper is a wind break plate 25 to avoid drifting of the chemical as dispensed to the bindweed, said plate being secured rockably by hook elements 26 spaced along its upper edge to engage with the lower extremity of the rockable wall 13', furthermore as a wind break there is positioned on one side of each wheel a disc 27 to close the area between the hub and rim of the wheel as a baffle transverse to the plate 26.

To weather proof the hopper at its upper extremity there is provided a flanged lid 28 to snugly engage thereover, the flanges E of which to engage externally on the hopper walls.

As a means to convey the machine there is provided a hand bar 29 substantially U-shaped, the parallel end portions of which are secured to their respective end plates of the hopper by appropriate means substantially as shown, the portion intermediate of said ends being in parallelism with the hopper and axle carrying means therefor. There is also provided an arm support 30 for the handle during idleness of the machine, said arm rockably carried, and the free end being supported by a loop 31 carried by the hopper while the machine is in action.

The clutch heretofore referred to is moved to and from engagement by its said lever 9 that is pivotally secured on the outer end of an extension 32 integral with the end of the hopper, the lever having on one end thereof a yoke 33 to move the sleeve against the tension of the spring for disengagement, the movement being accomplished by a crank portion from which a connecting link 34 extends, the other end of said link being connected to a rockable lever 35 that is pivotally carried by the said conveying arm, said link having a curve at its end adjacent its handle to provide an eccentric position to retain the handle when rocked to the position as shown by dotted lines F in Fig. 8, at which position, the clutch is disengaged and retained, against the tension of the spring.

While I have shown and described a container for marking substance at one end of the hopper, I do not wish to be restricted to such alone as each end of said hopper may have a similar equipment, and such other modifications may be made as lie within the scope of the appended claims.

Having fully described my invention what I claim as new and desire to secure by Letters Patent is:

1. A hopper for a chemical spreader comprising side walls in parallelism longitudinally and a corresponding marginal portion of each wall being in parallelism transversely with respect to the hopper, the other marginal portions of each being convergently positioned whereby a longitudinally disposed opening is provided between the free edges of said converging portions, a rectangular end plate closing the terminal ends of the side walls, a toothed axle journalled in said end plates, the said axle engaging in the portions, said plates each having shoulders on their confronting sides and on which the ends of the said walls seat, a lid for the hopper, a plurality of partitions transversely positioned between said walls and spaced apart therealong, the corresponding ends of said partitions being rigidly secured to one of the walls and likewise secured to the other wall except along its convergent portion whereby said other portion is free to rock outward and inward, an angle bar secured to the flexing portion adjacent the free edge thereof as stiffening means therefor longitudinally, an ear secured to the inner side of each end plate and in spaced relation to the respective ends of the angle bar, a coil spring for each end plate connecting the ears and the respective ends of the bar as means to rock said flexing portion outward, and each of said ears being apertured and threaded a spaced distance from its spring engagement, and a threaded bolt engaging in the aperture, one end of said bolt having a wing structure at its outer end to turn the bolt while the other end engages on the bar to rock said flexing portion inward to a predetermined distance from the toothed axle.

2. A hopper for a chemical spreader comprising side walls in parallelism longitudinally and a corresponding upper marginal portion of each wall being in parallelism vertically, the lower portions of said side walls converging downward and terminating in spaced relation whereby a longitudinally disposed exit opening is provided between the free edges of said converging portions, a ridged axle engaging in the exit opening of the converging portions of the walls, a rectangular plate closing each end of the side walls, each plate having a bearing in which the axle is journalled to carry the hopper, the hopper having a lid and a plurality of partitions transversely positioned between said walls and spaced apart therealong, the corresponding ends of said partitions being rigidly secured to one of the walls and likewise secured to the other wall except along its convergent portion whereby said other portion is free to rock outward and inward, an angle bar secured to the flexing portion adjacent the lower edge thereof as stiffening means therefor longitudinally, an ear secured to the inner side of each end plate and in spaced relation to the respective ends of the angle bar, a coil spring for each end plate connecting the ears and the respective ends of the bar as means to move said rockable portion outward, and each of said ears being apertured and threaded a spaced distance from its spring engagement, and a threaded bolt engaging in the aperture, one end of said bolt having a wing structure at its outer end to turn the bolt while the other end engages on the bar to rock said rockable portion inward to a predetermined distance from the axle.

3. In a hopper for a chemical spreader as recited in claim 2, plates positioned between the partitions and between the outer partitions and the respective end walls, said plates slidably engaging on the rigid convergent wall portion, said plates adapted to extend over the axle and to engagement with the rockable convergent wall as closing means for the hopper, and means to secure the plates in a closed or opened position at the exit opening between the convergent walls.

CHARLES E. VOLK.